No. 774,934. PATENTED NOV. 15, 1904.
C. S. CARD.
PORTABLE PIPE CUTTING AND THREADING MACHINE.
APPLICATION FILED FEB. 29, 1904.
NO MODEL. 4 SHEETS—SHEET 1.
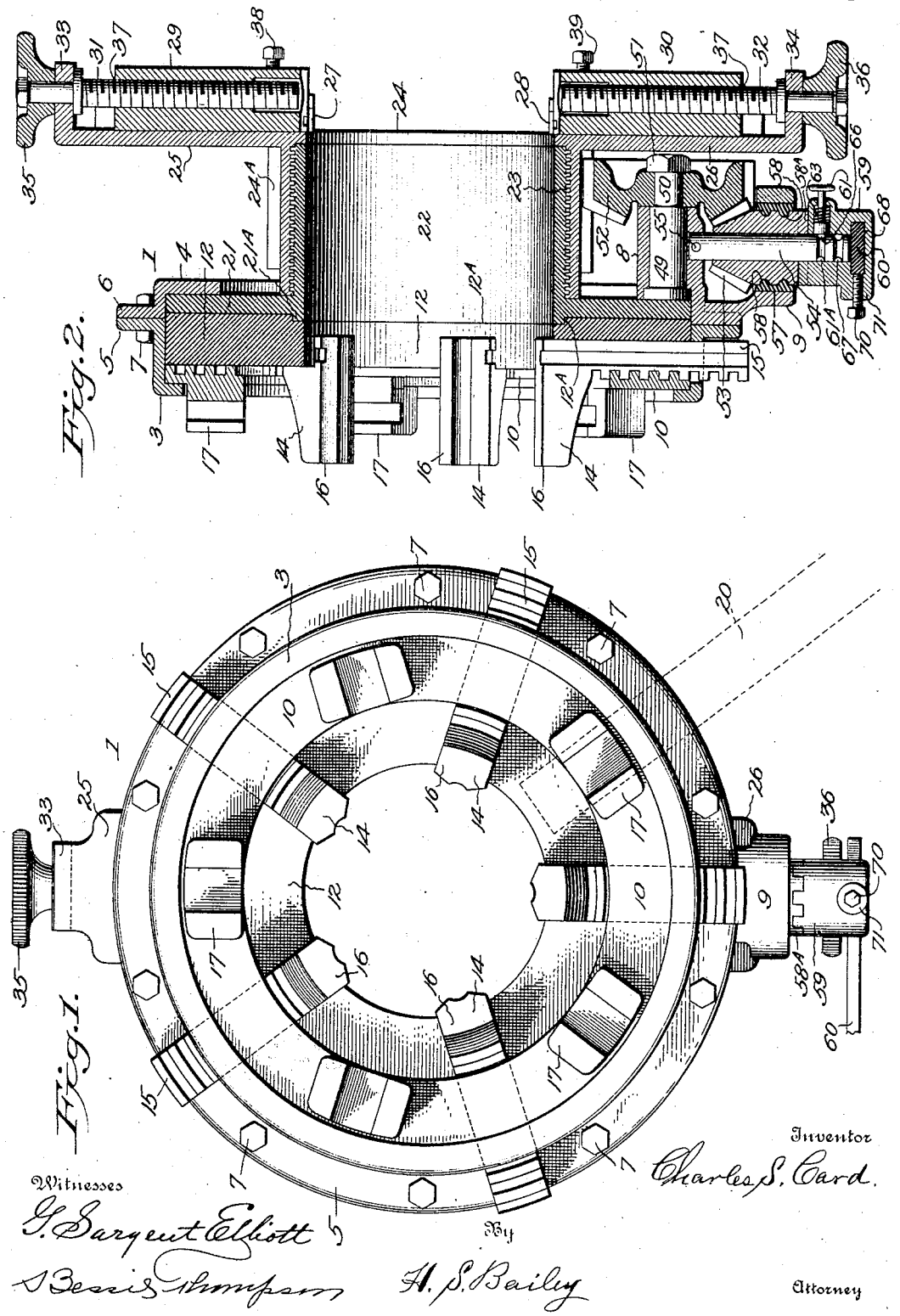
Witnesses
G. Sargent Elliott
Bessie Thompson
Inventor
Charles S. Card.
By H. S. Bailey
Attorney

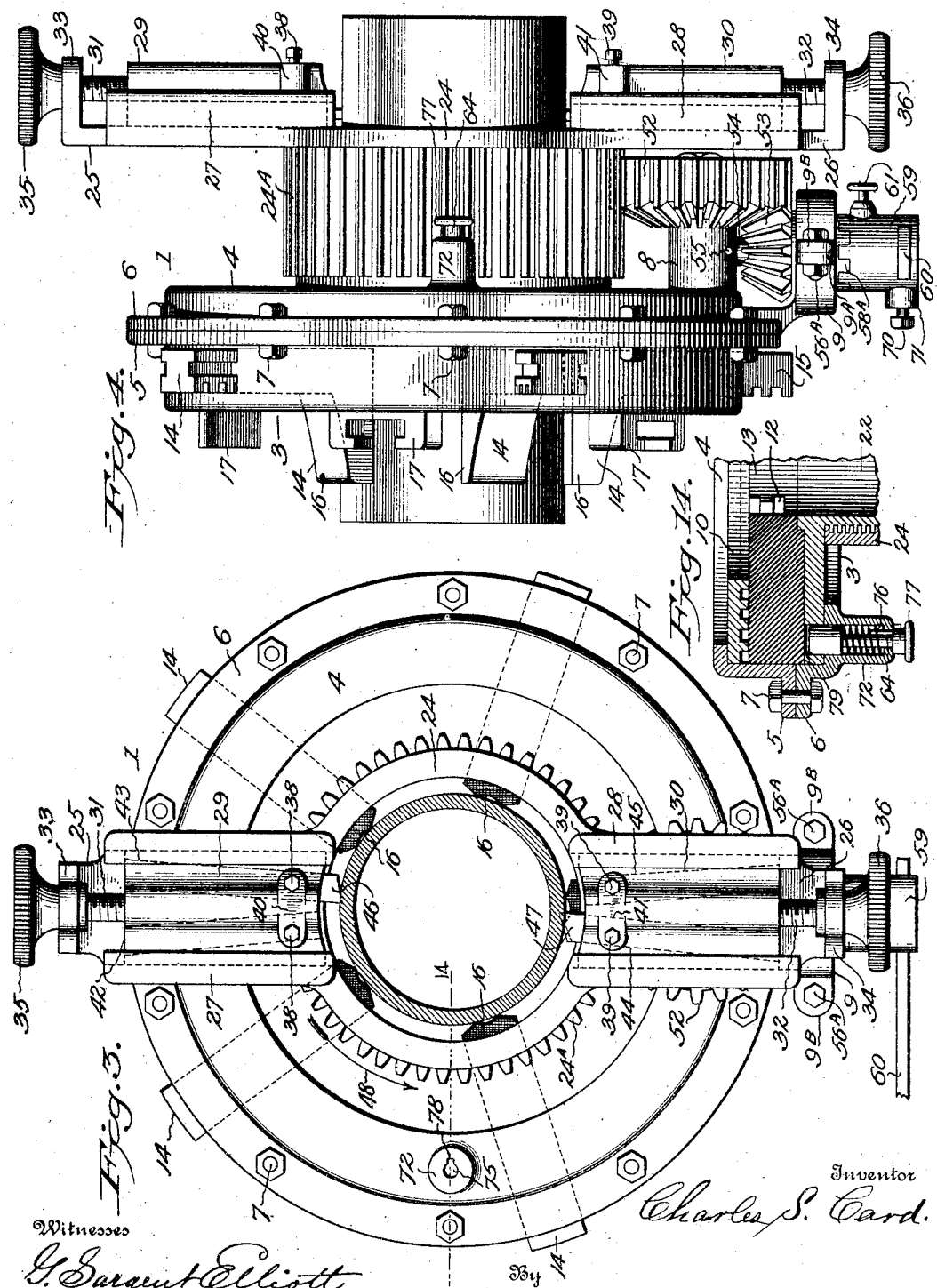

No. 774,934. PATENTED NOV. 15, 1904.
C. S. CARD.
PORTABLE PIPE CUTTING AND THREADING MACHINE.
APPLICATION FILED FEB. 29, 1904.
NO MODEL. 4 SHEETS—SHEET 3.
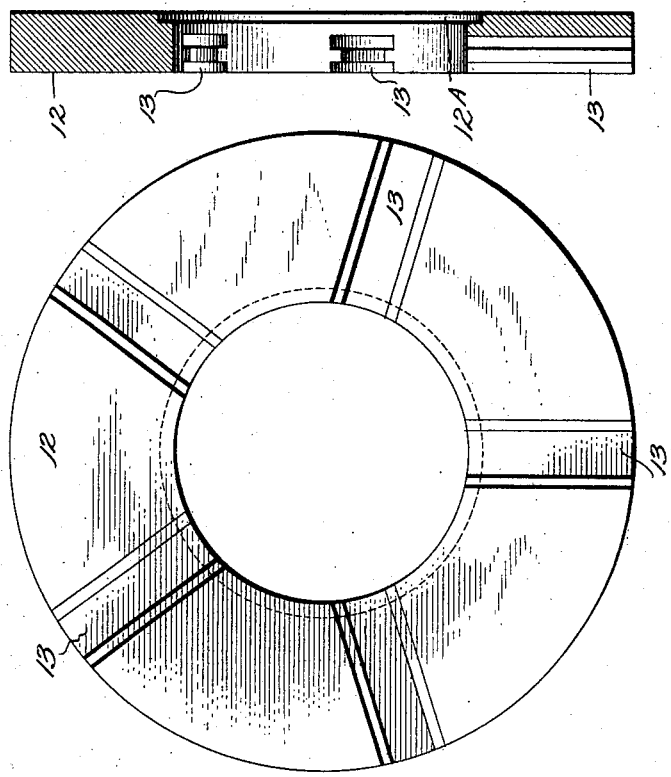
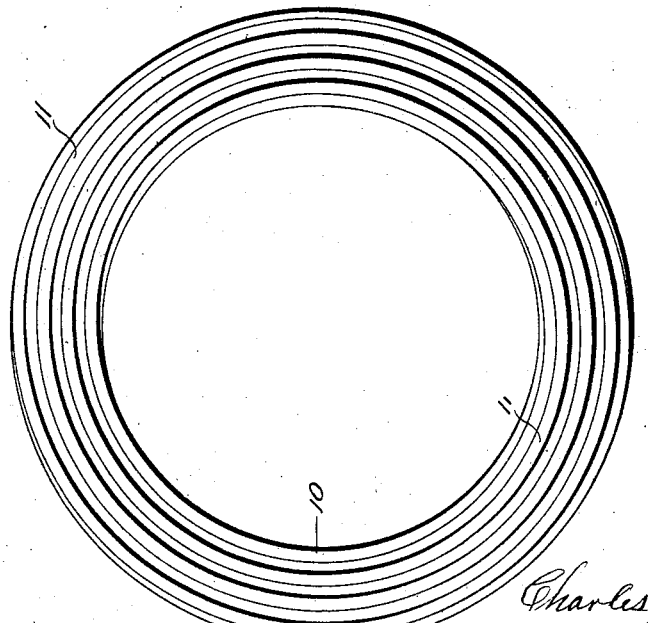
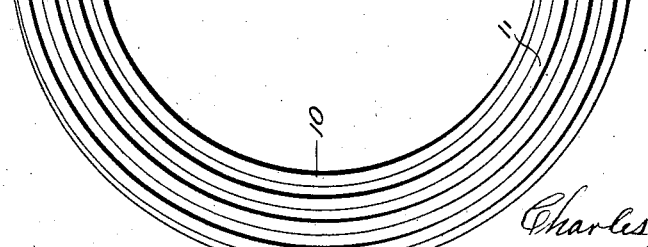
Witnesses
G. Sargent Elliott.
Bessie Thompson
By H. S. Bailey.
Inventor
Charles S. Card.
Attorney No. 774,934. PATENTED NOV. 15, 1904.
C. S. CARD.
PORTABLE PIPE CUTTING AND THREADING MACHINE.
APPLICATION FILED FEB 29, 1904.
NO MODEL. 4 SHEETS—SHEET 4.
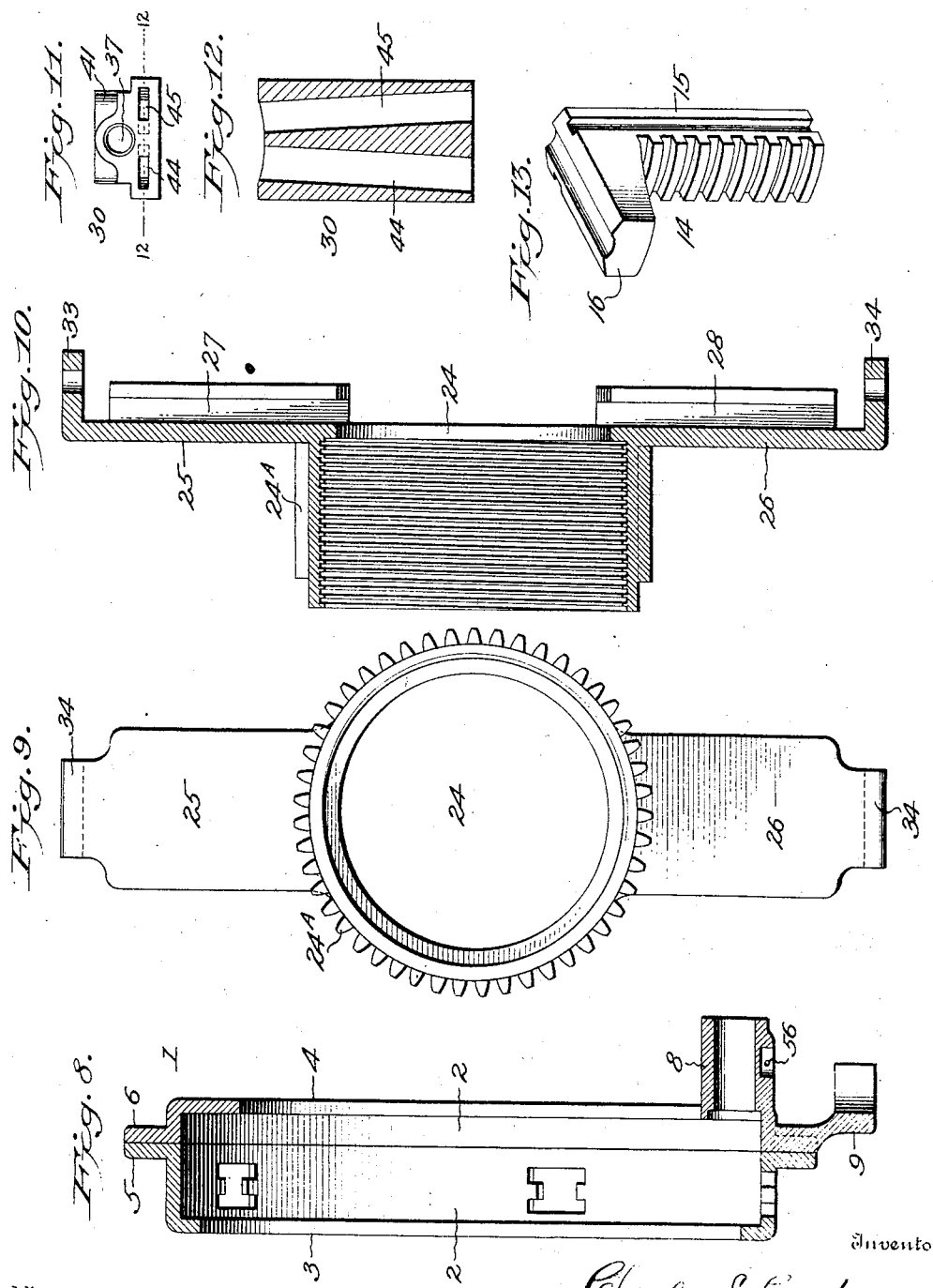

No. 774,934.                                   Patented November 15, 1904.

UNITED STATES PATENT OFFICE.

CHARLES S. CARD, OF DENVER, COLORADO.

PORTABLE PIPE CUTTING AND THREADING MACHINE.

SPECIFICATION forming part of Letters Patent No. 774,934, dated November 15, 1904.

Application filed February 29, 1904. Serial No. 195,834. (No model.)

*To all whom it may concern:*

Be it known that I, CHARLES S. CARD, a citizen of the United States of America, residing in the city and county of Denver and State of Colorado, have invented certain new and useful Improvements in Portable Pipe Cutting and Threading Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.
My invention relates to improvements in portable pipe cutting and threading machines; and the objects of my invention are, first, to provide a simple combined portable hand-operating pipe cutting and threading machine;
second, to provide a combined portable hand-operating pipe cutter and threader that can be mounted on and be held securely to a pipe and that will cut threads on pipe and that will also cut or sever the pipe; third, to provide a portable pipe and thread cutter that will cut threads on a pipe when the cutting-tools are moved in either direction axially along the pipe; fourth, to provide a portable hand-operating pipe and thread cutter provided with compound thread-cutting and cutting-off tools that are adapted to operate on opposite sides of a pipe and track in each other's cuts; fifth, to provide a simple, durable, and thoroughly practical portable hand-operating pipe and thread cutter. I attain these objects by the mechanism illustrated in the accompanying drawings, in which—

Figure 1 is a front elevation of my improved pipe cutter and threader. Fig. 2 is a central vertical sectional view thereof. Fig. 3 is a rear view of the pipe cutter and threader, showing a section of pipe clamped therein preparatory to being threaded. Fig. 4 is a side elevation of the pipe cutter and threader with the section of pipe clamped therein. Fig. 5 is a rear view of a scroll-ring used to operate the pipe-gripping jaws of my improved device. Fig. 6 is a front elevation of the jaw-supporting ring. Fig. 7 is a central vertical sectional view of the same. Fig. 8 is a central vertical sectional view of the casing which incloses the various parts of the threader and cutter. Fig. 9 is a front elevation of the tool-carrier. Fig. 10 is a longitudinal vertical sectional view of the same. Fig. 11 is an end elevation of the tool-holder. Fig. 12 is a sectional view of the same on the line 12 12 of Fig. 11. Fig. 13 is a perspective view of one of the pipe-gripping jaws, and Fig. 14 is a fragmentary view illustrating the manner of locking the lead-screw or thread-ring to the casing.

Similar numerals of reference refer to similar parts throughout the several views.

Referring to the drawings, the numeral 1 designates a circular casing provided with a finished circumferential chamber 2. I preferably divide the casing into two parts 3 and 4, provided with flanges 5 and 6, which are bolted together by bolts 7. The part 4 of the casing is provided with a laterally-extending hub portion 8 near the periphery of its flanges and also with a journal-box 9, that projects beyond the periphery of its flange and over the hub 8. Both ends of the casing are provided with a large circular opening. In the outer end portion of the part 3 of the casing I mount a circular ring 10, which I term the "scroll-ring." This scroll-ring is finished to fit rotatively against the inner periphery of the casing and its adjacent introverted flange. On the inner side of this ring 10 I form a spiral or scroll thread 11. (See Fig. 5.) At the side of this scroll-threaded ring I place a ring 12, which I term a "jaw-ring." The jaw-ring is snugly mounted in the casing. I form in the side of this ring 12 a plurality of slideway-recesses 13, preferably using and placing them at equal distances apart. In each of these slideways 13 I fit a jaw 14, which is adapted to slide loosely in its slideway. These jaws consist of a body portion 15, which fits in the slideway, and a pipe-clamping foot portion 16. The pipe-clamping foot portion is preferably formed to extend at right angles to the body portion of the jaws outward from the jaw-ring and beyond the casing 1. The side of the body portion of the jaws opposite the scroll-threaded ring is provided with teeth that are arranged and adapted to operatively mesh into the spiral thread of the ring 10. These two rings 10 and 12, with the jaws 14, form the pipe-holding chuck of my thread and pipe cutter. On the outside of the scroll-ring I form a plurality of socket-lugs 17, preferably using five, which I space equidistant apart between the jaws and arrange them to project through and beyond the opening in the end of the casing. These sockets each preferably comprises a lug 17, formed on the outside of the ring, having a T-shaped slot therein which is adapted to receive the end of any suitable lever 20 which will fit in them. This lever, which consists of a bar or rod of iron, is used to turn the scroll-ring, which through its spiral or scroll thread moves all the jaws simultaneously toward or from the axial center of the rings and casing, and as the jaws are connected to the scroll-ring in a circumferential plane concentric to the axis of the said rings and casing they move concentrially to and from the center and when closed on a round pipe they all grip it at the same time concentrically to the axis of the rings and casing. In the casing between its part 4 and the jaw-ring 12 I fit snugly and rotatably a ring 21, which I term the "lead-screw" ring. This lead-screw ring is provided with a long hollow drum or hub 22. The inner diameter of the ring and its drum, as well as of the scroll and jaw rings, are large enough to permit a six-inch pipe to pass loosely through them. A counterbore $21^A$ is formed in the inner periphery of the jaw-ring adjacent to the lead-screw ring. A circumferential hub $21^A$ is formed on the inner periphery of the lead-screw ring and fits rotatably in the counterbore of the jaw-ring. This hub operates to center the lead-screw ring in the jaw-ring. The outside periphery of the drum 22 is provided with an eight-pitch screw-thread 23, as all threads used on pipe from two and one-half inches in diameter up to the largest sizes made are standard eight-pitch threads or eight threads to the inch inverted-V threads. Consequently the thread 23 must be of that pitch when cutting threads of eight pitch. My invention, however, contemplates the cutting of threads of other pitches, and when this is done a lead-screw ring and a tool-carrier ring are employed that are provided with the number of threads that are to be cut. Thus when cutting threads on well-casing fourteen threads to the inch are used and a lead-screw and tool-carrier with threads of fourteen pitch will have to be used in the machine. I preferably use a square thread on the lead-screw, however, as it is better adapted for its work as a lead-screw. A tool-carrier ring 24 is interiorly threaded to rotate loosely on the lead-screw ring. This ring is of the same length as that of the lead-screw drum, so that they each will screw to the end of the other. The tool-carrying ring 24 is provided with two diametrically-disposed standards 25 and 26, which project from its outer edge at right angles to its axis. These standards contain slideways 27 and 28, in which are slidably fitted tool-holders 29 and 30. These tool-holders are fed diametrically to and from the axis of the pipe-cutter by feed-screws 31 and 32, which are rotatably journaled in lugs 33 and 34, formed on the outer ends of the standards. Hand-wheels 35 and 36 are mounted on the ends of the screws beyond the lugs. These feed-screws are threaded loosely into a threaded hole 37, that extends through the tool-holders. The thread-cutting and cutting-off tools are secured in rectangular-shaped recesses or holes 42, 43, 44, and 45, formed in the holders, by set-screws 38 and 39, that are threaded into lugs 40 and 41, formed on the outer end of the tool-holders. These tool-holding recesses extend through the tool-holders, as shown in Fig. 12. I preferably provide each tool-holder with two tool-receiving recesses and preferably arrange the recesses of each tool-holder on each side of the axial center of the feed-screw and at a diverging angle from the axis of the machine, as shown in Figs. 3 and 12, as this arrangement permits me to use cutters to cut threads or cut off pipe when turning the machine in either direction. Thus in Fig. 3 the cutters 46 and 47 are shown in the tool-recesses 43 and 44 at one side of the diametrically vertical center of the standards, and the machine must be revolved in the direction of the arrow 48 in order to cut threads or cut off a pipe with the tools in these tool-holding recesses. If, however, it is desired to rotate the machine in the opposite direction from the arrow 48, the tools 46 and 47 will have to be removed from the recesses 43 and 44 and be placed in the recesses 42 and 45. The cutters are thus held on the opposite sides of the pipe and just back of its diametrical center, and the cutters are formed so as to stand at enough offset to one another to follow each other in cutting threads. In cutting off pipe, however, the cutting-off tools are arranged with their cutting-points directly opposite each other.

In the hub 8 of the flange 4 of the casing 1 I rotatably mount a stud 49, which projects beyond the hub and is provided with a reduced portion 50, to the end of which a nut 51 is threaded. Upon the end of this stud I secure by the nut 51 a combined spur and bevel gear 52, the spur-gear toothed portion of which meshes with a ring-gear $24^A$, formed on the tool-carrying ring 24, the teeth of which are long enough to maintain mesh with the said spur-gear when the tool-carrying ring is screwed backward and forward upon the drum of the lead-screw ring. The bevel-gear portion of the gear 52 meshes with a bevel-pinion 53, that is rotatably mounted on a stud 54, that is secured at one end by a pin 55 in a hole 56, that extends a short distance in the hub 8. The opposite end of the stud 54 extends centrally through and beyond the journal-box 9. This box 9 I preferably form in two parts, and I provide each part with flanges $9^A$ and $9^B$ and bolt them together with bolts $56^A$. The bevel-pinion is provided with a hub that projects through the box 9 and is made enough smaller in diameter than the inner diameter of the box to be surrounded by Babbitt metal 57 and is provided with circumferential grooves 58, which confine it against lateral movement in the box. The end of the hub of the bevel-pinion projects beyond the box and is provided with a circumferential row of clutch-teeth $58^A$, which mesh into a similar set of clutch-teeth formed on the adjacent end of a crank-hub 59, that is also rotatably mounted on the stud 54. This crank-hub 59 is made independent of a hand-lever 60. This hub extends to the end of the stud and is held rotatably therein by a spring-actuated pin 61, that extends through a boss cast on the hub and into a circumferential groove $61^A$, formed in the stud. The pin 61 extends through the boss, and a finger-disk is secured to its outer end. A spring 63 is placed in a channel formed in the boss around the pin and bears at one end against the end of the chamber and at the opposite end against an enlarged collar portion formed on the pin, which fits loosely in the chamber of the boss, the end of which is provided with a small central pin 66, that fits in the groove of the stud. A second groove 67 is formed in the stud at a sufficient distance from the groove toward the hub of the bevel portion to permit the hub to be drawn back far enough to disengage it from the hub of the bevel-pinion and lock the hub in that uncoupled position by the pin 61. The end of the crank-hub is provided with a crank-lever-receiving slot 68, in which one end of the lever 60 is secured by a set-screw 70, that is threaded to a boss 71 to extend into the slot and clamp the lever in it.

On the side of the flange of the part 4 of the casing 1 I form a boss 72, in which a chamber 73 is formed. A pin 64 extends into the boss through an opening 75 in the end of the boss which is smaller in diameter than its chamber. The inner end of the pin is enlarged to fill slidingly the chamber, and an expansive spring 76 is placed in the chamber around the pin and bears at one end against the end of the chamber and at its opposite end against the enlarged end of the pin. A finger-disk 77 is placed on the outer end of the pin outside of the boss. A keyway 78 is cut through the outer entrance of the boss into its chamber, and a feather-key is secured on the pin and extends from the finger-disk a suitable distance inside of the chamber when the finger-disk is against the boss. The feather-key is made enough smaller than the keyway in the boss to pass loosely through it when the pin is pulled back by the finger-disk. The inner end of the pin is long enough to extend into holes 79, formed at equal distances apart in a concentric row in the adjacent face of the lead-screw ring 21. The function of this spring-controlled finger-disk pin is to normally lock the lead-screw ring to the flange of the part 4 of the casing 1 and prevent it from rotating when cutting threads on pipe, thus permitting the tool-carrier ring and its standards to be rotated by the crank-lever and the gears and be screwed back and forth on the lead-screw ring when cutting threads on pipe. When, however, it is desired to cut a pipe in two, the finger-disk is drawn back far enough to withdraw the feather-key from the keyway in the boss, and then the finger-disk and the pin is turned around far enough to bring the feather-key out of alinement with the keyway and is held there by the expansive power of the spring 76. When the pin is drawn back far enough to come out of its keyway, the inner end of the pin is withdrawn from the hole in the lead-screw ring, and it is free to turn. The tool-carrier is then turned on the lead-screw ring as far as it will go, and both rings and the standards and tools are rotated together in the reverse direction of the arrow 48, which keeps them locked together.

The operation of my improved threaded pipe-cutter is as follows: The machine is mounted on a piece of pipe 77 (see Fig. 4) in position to cut off a piece of it or to cut a thread. The jaws of the chuck are then screwed down to very tightly grip it by applying the lever 20 to the sockets 17 and turning the small ring. In Fig. 4 a short nipple is shown in the machine in position to cut a thread on it, and the thread-tools having been secured in the tool-holders are adjusted by the hand-wheels so that both will cut a chip as they are rotated around the pipe. The crank is then applied to the crank-hub and the gears are turned, which rotates the gear-ring and standards and thread-tools around the nipple. In Fig. 4 the gear-ring is shown screwed up against the lead-screw ring and the nipple has been clamped in the machine to commence cutting the thread from the end of what will be the thread after it is cut instead of the beginning of the thread at the end of the nipple, and the thread is to be started from its inner end and cut to the end of the pipe. As a pipe-thread is generally tapering and a thread can be cut more advantageously in this manner than when cutting from the end of the pipe to the end of the thread end, as it is easier to maintain a steady feed of the tools into the pipe as they advance toward its end than to back the tools off from the pipe and the cuts it is taking in order to form the taper when the tools are moving from the end of the pipe to the inner end of the thread, for the reason that in backing off the tools are crowding back against the feed-screw and there is a little back push and a constant tendency to feed back too fast, and an operator is more apt to entirely lose his cuts at some point in the length of the thread, which necessitates more cuts along the thread (unless great care is taken) and results in a rougher thread than when cutting from the inner end out. When a cut has been made, in order to run the tools back quick to take another cut the crank-hub is uncoupled from the bevel-pinion by pulling out the pin and slipping the crank-hub back on the stud 54 and locking it in its uncoupled position by placing the pin in the groove 67 of the stud. The gear-ring and standards and the thread-tools can then be rotated very fast by catching hold of the standards and twisting the tool-holder to screw it onto the thread-ring.

Having described my invention, what I claim as new, and desire to secure by Letters Patent, is—

1. In a portable pipe threader and cutter of a casing, a pipe-gripping chuck in said casing, a rotatable lead-screw mounted in said casing, means, including a pin spring-actuated in one direction of its movement and adapted to be locked in the other direction of its movement for locking said lead-screw to said casing, a tool-carrier rotatably mounted on said lead-screw and means for rotating said tool-carrier, substantially as described.

2. In a portable pipe threader and cutter, the combination with the casing, the chuck, the lead-screw ring, the tool-carrier, the gear on the periphery of said tool-carrier, and pipe-cutting tools, of the combination spur and bevel gear rotatably supported by said casing; the bevel-pinion engaging said bevel-gear, the crank and crank-hub and means including a clutch connection for coupling and uncoupling said crank-hub, to said bevel-pinion, substantially as described.

3. In a portable pipe threader and cutter, the combination of the casing, the chuck, the lead-screw ring and the adjustable tool-carrier, provided with axial apertures through which pipe is placed and the pipe-gripping jaws in said chuck, adapted to grip said casing to said pipe, with a bearing projecting from said casing adjacent to said lead-screw and tool-carrier, a fixed shaft extending axially through said bearing, a pinion rotatably mounted in said bearing on said fixed shaft against axial movement, clutch-teeth on one end of said bevel-pinion; a crank-receiving hub slidably mounted on the outward end of said fixed shaft, and provided with clutch-teeth at its inner end, and adapted to register with the clutch-teeth of said bevel-pinion, means including a finger-operating pin spring-controlled in one direction of its movement, said pin securing said crank-hub in coupled and uncoupled relation with said beveled pinion, a crank-lever adjustably secured to the outer end of said crank-hub, a combined spur and beveled gear rotatably supported by said casing in mesh with said bevel-pinion and a gear surrounding said tool-carrier and in operative mesh with said combined spur and bevel gear and arranged and adapted to move reciprocally in its teeth as said tool-carrier is rotated on said lead-screw ring, substantially as described.

4. In a portable pipe threader and cutter the combination of a ring-shaped casing comprising two circumferentially-flanged rings, provided with introverted side flanges at their ends containing a concentric axial aperture, and bolted together at their flanged ends, and provided with suitable journal-bearings projecting from one of said introverted flanges suitable power gearing rotatably mounted in said journal-bearings, means for rotating said gearing, a cylindrical ring rotatably mounted in said casing, provided with an axial aperture, adapted to permit it and said casing to be placed over pipe, a screw-thread corresponding in pitch to the thread to be cut on pipe, on the periphery of said cylindrical ring, a cylindrical drum threaded to said cylindrical ring, a gear formed on the outer periphery of said cylindrical drum, meshing with said gearing, diametrically and oppositely arranged slideways adapted to carry tools on the outer end of said cylindrical drum, means for rotating said cylindrical ring and said cylindrical drum together when cutting off pipe, and means for locking said cylindrical ring to said casing when cutting threads, substantially as described.

In testimony whereof I affix my signature in presence of two witnesses.

CHARLES S. CARD.

Witnesses:
G. SARGENT ELLIOTT,
BESSIE THOMPSON.